United States Patent
Kaura et al.

(10) Patent No.: US 8,055,774 B2
(45) Date of Patent: Nov. 8, 2011

(54) METHOD FOR IMPROVING SUBSCRIBER DATA INTEGRITY IN AN IMS NETWORK

(75) Inventors: Ricky Kaura, Uxbridge (GB); Sourabh Anpat, London (GB)

(73) Assignee: Genband US LLC, Plano, TX (US)

( * ) Notice: Subject to any disclaimer, the term of this patent is extended or adjusted under 35 U.S.C. 154(b) by 155 days.

(21) Appl. No.: 12/172,562

(22) Filed: Jul. 14, 2008

(65) Prior Publication Data

US 2009/0119404 A1 May 7, 2009

Related U.S. Application Data

(60) Provisional application No. 60/984,817, filed on Nov. 2, 2007.

(30) Foreign Application Priority Data

Dec. 31, 2007 (GB) .................................. 0725348.7

(51) Int. Cl.
*G06F 15/173* (2006.01)
(52) U.S. Cl. ......... 709/226; 709/220; 709/222; 370/254
(58) Field of Classification Search .................. 709/220, 709/222, 226; 370/254
See application file for complete search history.

(56) References Cited

U.S. PATENT DOCUMENTS

| | | | | |
|---|---|---|---|---|
| 2007/0053330 | A1* | 3/2007 | Stafford et al. ............... | 370/338 |
| 2008/0020745 | A1* | 1/2008 | Bae et al. .................... | 455/422.1 |
| 2008/0160996 | A1* | 7/2008 | Li et al. ........................... | 455/433 |
| 2010/0009678 | A1* | 1/2010 | Munoz et al. ................. | 455/433 |
| 2010/0229027 | A1* | 9/2010 | Vergara et al. .................... | 714/4 |

FOREIGN PATENT DOCUMENTS

| | | | |
|---|---|---|---|
| WO | 2008/031298 | A1 * | 3/2008 |
| WO | 2008/071229 | A1 * | 6/2008 |
| WO | 2008/154955 | A1 * | 12/2008 |

OTHER PUBLICATIONS

"3rd Generation Partnership Project; Technical Specification Group Core Network and Terminals; Mobile Application Part (MAP) specification; (Release 8)," 3GPP TS 29.002, V8.6.0, pp. 1-917 (Jun. 2008).
"3rd Generation Partnership Project; Technical Specification Group Core Network and Terminals; Study on IMS Restoration Procedures (Release 8)," 3GPP TR 23.820, V0.3.0, pp. 1-33 (Oct. 2007).

(Continued)

*Primary Examiner* — Wing Chan
*Assistant Examiner* — Kostas Katsikis
(74) *Attorney, Agent, or Firm* — Jenkins, Wilson, Taylor & Hunt, P.A.

(57) ABSTRACT

An IMS system including a Home Subscriber Server including data for terminals connecting to the IMS. The Home Subscriber Server being arranged to transmit a reset message to components such as application servers and S-CSCF in the IMS when it undergoes a reset. The receipt of a reset message causing the component to mark the terminals that the HSS stores the data for as not confirmed. The component then, either automatically or in response to a message, transmits a message to the Home Subscriber Server to request user profile data for a user terminal connecting to the IMS or accessing services from the IMS.

20 Claims, 4 Drawing Sheets

OTHER PUBLICATIONS

"3rd Generation Partnership Project; Technical Specification Group Core Network; Restoration procedures (Release 7)," 3GPP TS 23.007, V7.0.0, pp. 1-21 (Jun. 2006).

"3rd Generation Partnership Project; Technical Specification Group Core Network and Terminals; IP Multimedia (IM) Subsystem Cx and Dx interfaces; Signalling flows and message contents (Release 7)," 3GPP TS 29.228, V7.0.0, pp. 1-57 (Dec. 2005).

* cited by examiner

METHOD FOR IMPROVING SUBSCRIBER DATA INTEGRITY IN AN IMS NETWORK

FIELD OF THE INVENTION

This invention relates to a method for improving users' subscriber data integrity in an IMS network. It is of particular use after the Home Subscriber Server (HSS) performs a reset.

BACKGROUND OF THE INVENTION

An IP multimedia subsystem (IMS) is a functional network architecture used to facilitate the delivery of multimedia services, such as telephony over IP and video-conferencing, over an IP network. It is of particular use in cellular networks that allow users of cellular telephones to access Internet services.

Typically an IMS 10 has the architecture illustrated in FIG. 1. It has an application layer 12 that includes application servers 14. The application servers 14 host the services provided to users by the IMS 10. The application layer 12 also includes a Home Subscriber Server (HSS) 16. The HSS 16 stores information, such as identification information and subscription-related information, for each user terminal using the IMS 10. In one embodiment, HSS 16 is the master database for the IMS network. HSS 16 may be include one or more physical database. For example, a physical database may be implemented using physical storage, e.g., non-transitory computer readable media.

The IMS layer 18 is responsible for media and session control within the IMS 10. It includes Call Session Control Functions (CSCF) which establish, monitor, support and release multimedia sessions. The CSCFs also manage service interactions for each user within the IMS. A CSCF may be a Serving-CSCF (S-CSCF) 20, Proxy-CSCF (P-CSCF) 22 or an Interrogating-CSCF (I-CSCF) 24 and is preferably a SIP server.

The S-CSCF 20 is located within the network controlled by the HSS 16, also known as the home network, and stores the details of user terminals accessing services in the home network. It controls communication sessions within the IMS 10 by invoking an application server 14 that can provide a service in response to a request from a user terminal for the service. The P-CSCF 22 is assigned to a terminal when it registers with a network and becomes the contact point of the terminal. The P-CSCF 22 can be in either the home network of the terminal or the visiting network. The I-CSCF 24 provides a gateway between different IMS 10 and enables topology hiding and the use of multiple S-CSCF 20 in an IMS 10.

Finally, the transport layer 26 enables a user terminal 28 to access the IMS 10. It includes user terminals such as cellular telephones 28 and may also include, among other components, gateways (not shown) to allow non IMS-compatible systems, such as VoIP systems, to access the IMS 10.

As will be known by one skilled in the art the components present in the IMS are not limited to those described above.

In order to access a service a user will cause a user terminal 28 to request a service. The request is routed through to the S-CSCF 20. The S-CSCF 20 authenticates the user identity of the user terminal 28 with the HSS 16 in the home network and, if the service can be provided, forwards the request to an application server 14. The application server 14 can then provide the service to the user terminal 28. All messages exchanged between the application server 14 and the user terminal 28 are passed through the S-CSCF 20.

When a user terminal 28 initially registers and authenticates a user identity in an IMS 10, the S-CSCF 20 downloads authentication vectors from the HSS 16 and performs the authentication of the user terminal 28. If the user terminal 28 is successfully authenticated, the S-CSCF 20 downloads, from the HSS 16, the user profile associated with the user terminal's 28 user identity.

After initial registration, the user terminal 28 may re-register, but the HSS 16 may not be contacted for this re-registration. This is because the user terminal 28 is doing a periodic refresh of its registration status and there is no need to re-authenticate the user terminal 28 again, nor download a fresh user profile from the HSS 16. This means that if the HSS 16 is reset, for example because of a hardware upgrade data, inaccuracies may occur. Hence, what is needed is a method for improving the integrity of the subscriber data in the event of an HSS Reset.

SUMMARY OF THE INVENTION

According to a first aspect of the present invention there is provided a method for improving subscriber data integrity of a user in an IP multimedia sub-system (IMS) network comprising the steps of a home subscriber server (HSS) transmitting a system notification message to a component in the IMS, the component, upon receiving the system notification message marking alt terminals associated with the HSS, the component transmitting a request message for a marked terminal to the HSS, the HSS transmitting a response message to the component indicating data for the terminal and the component marking the terminal as subscriber data confirmed by the HSS The component may be a serving call session control function (S-CSCF) or an application server.

Preferably, the request message is transmitted in response to a trigger in order to reduce the immediate load on the system. For the S-CSCF the trigger to request a fresh subscriber data download from the HSS may be a session origination request received from a terminal, a session termination request received from a terminal or a re-registration request received from a terminal. For the application server the trigger may be a request for a service received from a terminal, an invite request from an S-CSCF, the receipt of a third-party registration request from an S-CSCF, an operator performing an action on the application service or an action being performed on a web interface provided by the application server.

The request message sent by the S-CSCF is a server assignment request message and the response to this request message contains the user data. The request message sent by the application server is a user data request message and the response to this request message contains the user data.

The application server and S-CSCF mark the records stored for the terminals by changing the HSS confirmed flag for these terminals to false. Conversely the application server and S-CSCF may change the HSS confirmed flag for the terminals to true when the subscriber data has been re-synchronised by the HSS.

Current procedures allow the S-CSCF to bypass a download of the data profile if it believes that the data stored at the S-CSCF is already up-to-date when it receives (for example) a re-registration request. To override an attempt by the S-CSCF from requesting the HSS not to send a profile download, the HSS may mark the terminal records to indicate that a system notification message has been sent to the S-CSCF but a fresh data download has not yet been sent by the HSS. This mark is removed when the HSS sends the data to the S-CSCF for the user following the system notification message.

The system notification message sent by the HSS may be an HSS-Reset message.

Diameter messages may be used to indicate that the HSS has been reset and to request data from the HSS for a terminal. This is advantageous as Diameter messages are acknowledged by each recipient and therefore delivery can be assured.

In accordance with another aspect of the present invention there is provided an HSS in an IMS arranged to transmit a notification message to a component in the IMS; and to transmit a response message to the component indicating data for the terminal upon receiving a request message for a terminal from a component in the IMS.

In accordance with a further aspect of the present invention there is provided a S-CSCF in an IMS comprising an input configured to receive a notification message indicating an HSS reset, a database including terminal information, processing means arranged to mark all terminals in the database associated with the HSS from which the notification method was received, an output arranged to transmit a request message for a marked terminal to the HSS (based upon a trigger received at the S-CSCF), an input to receive a response message from the HSS containing user data and processing means arranged to mark the terminal as data confirmed by the HSS, in the S-CSCF upon receiving the response message from the HSS for the terminal.

In accordance with yet another aspect of the present invention there is provided an application server in an IMS comprising an input configured to receive a notification message indicating an HSS reset, a database including terminal information, processing means arranged to mark all terminals in the database associated with the HSS from which the notification method was received, an output arranged to transmit a request message for a marked terminal to the HSS (based upon a stimulus received at the AS), an input to receive a response message from the HSS containing user data and processing means arranged to mark the terminal as data confirmed by the HSS, in the AS upon receiving the response message from the HSS for the terminal.

In accordance with another aspect of the present invention there is provided an IMS including an HSS in an IMS arranged to transmit a notification message to a component in the IMS; and transmit an response message to the component indicating data for the terminal upon receiving a request message for a terminal from a component in the IMS. The IMS also includes an S-CSCF or an Application Server (AS): comprising an input configured to receive a notification message indicating an HSS reset, a database including terminal information, processing means arranged to mark all terminals in the database associated with the HSS from which the notification method was received, an output arranged to transmit a request message for a marked terminal to the HSS, an input to receive an response message from the HSS containing user data and processing means arranged to mark the terminal data confirmed by the HSS upon receiving the response message from the HSS.

BRIEF DESCRIPTION OF THE DRAWINGS

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
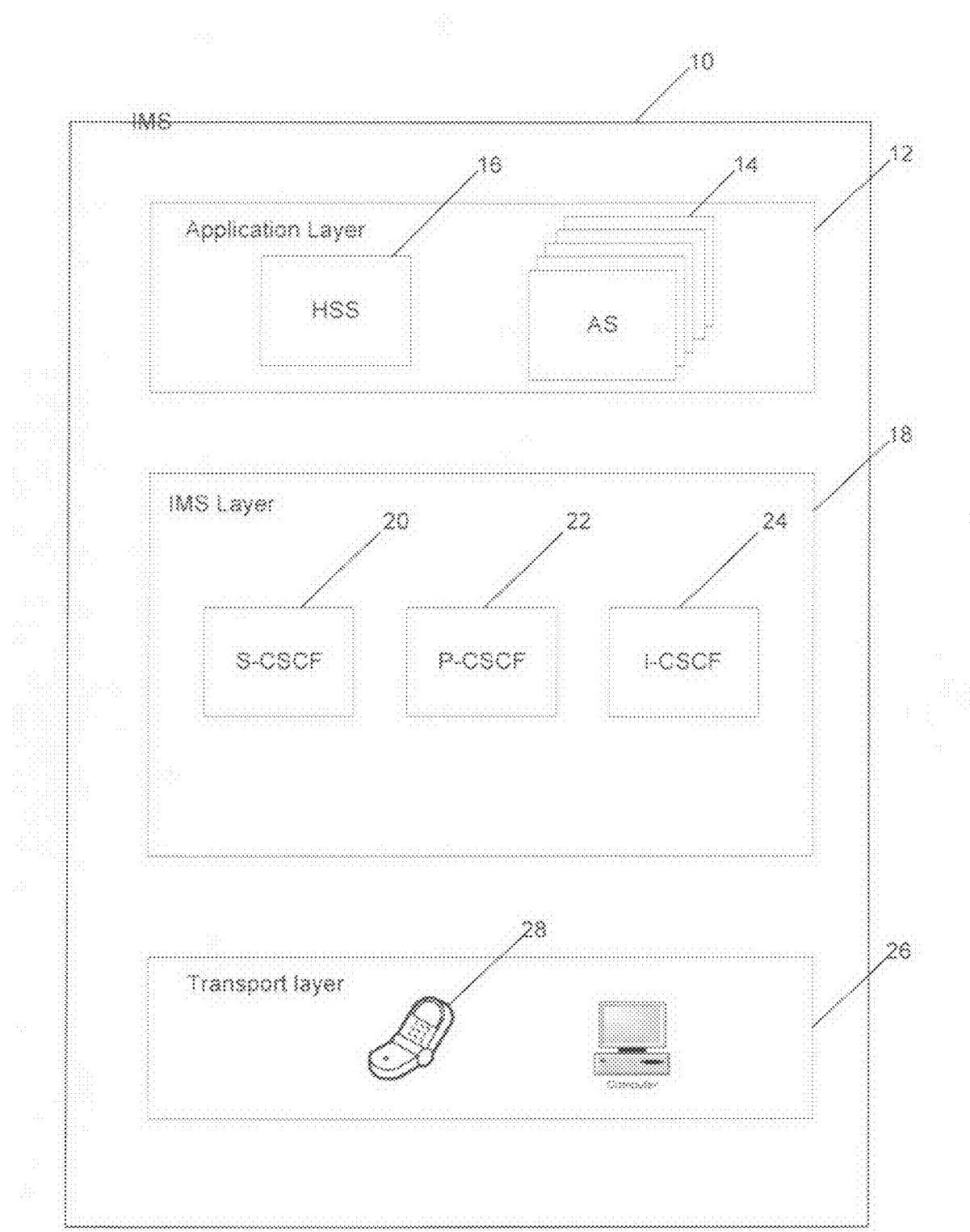
FIG. 1 illustrates an IP multimedia subsystem as is known in the art.

The present invention may be implemented in an IMS having the architecture illustrated in FIG. 1.

Figure 2:
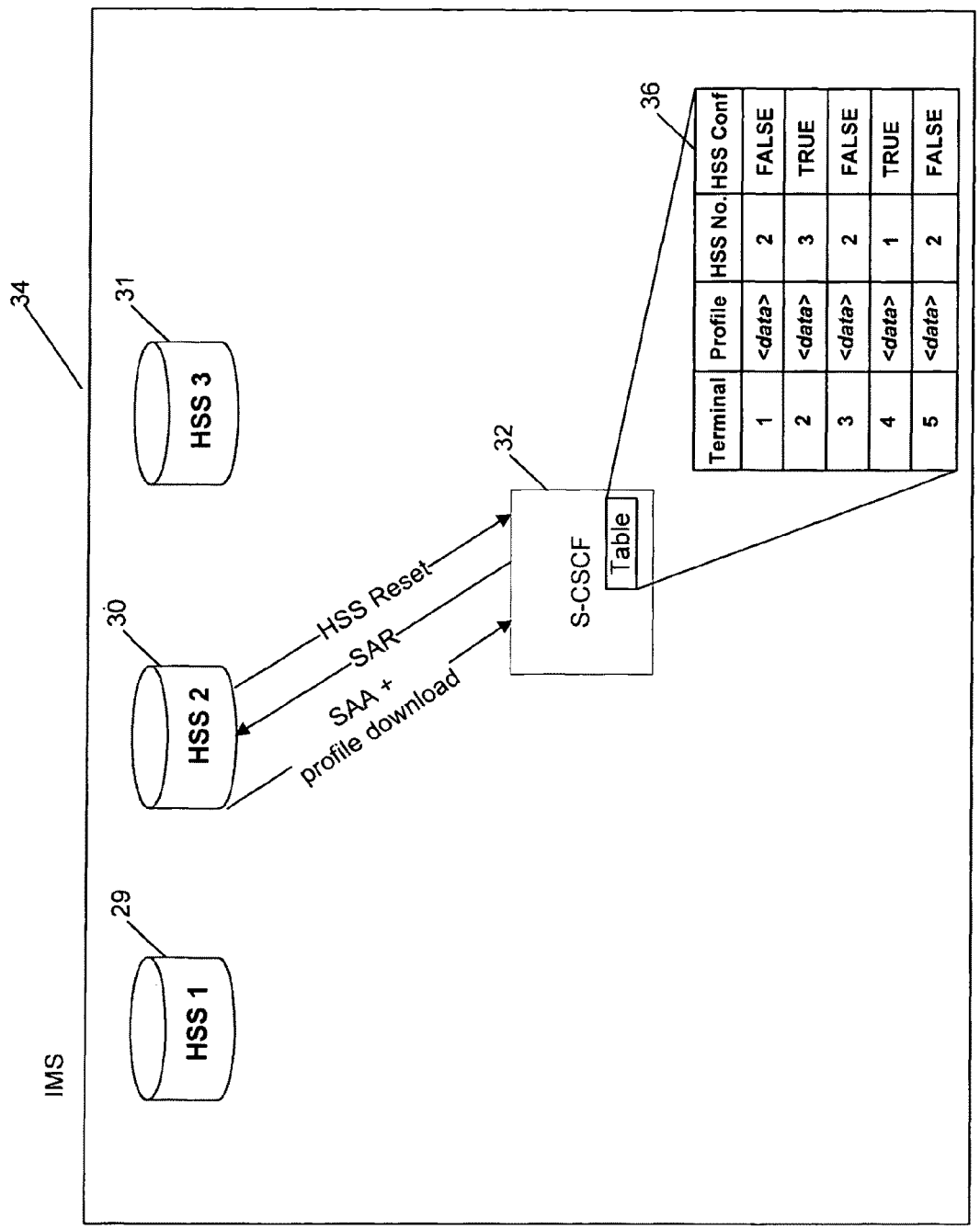
FIG. 2 illustrates an IMS of the present invention.

FIG. 2 illustrates the process which occurs when restoration of the data in an HSS occurs (in this case HSS2 30). The data restoration may occur, for example, due to an upgrade, restart, data corruption or for any other reason. When data restoration occurs on HSS2 30, HSS2 30 transmits an HSS-Reset message to any S-CSCF 32 located in its IMS 34. The S-CSCF 32 upon receiving the HSS-Reset message by the S-CSCF 32 flags any terminal whose data is stored on HSS2 30 as not being confirmed.

Terminal details are stored in the S-CSCF 32 in a table 36. As can be seen terminals 1, 3 and 5 are all identified as having their data stored on HSS2 30 causing the S-CSCF 32 to change the HSS confirmation flag to false. The HSS confirmation flags for the other terminals (2 and 4) which are associated with HSS1 29 and HSS3 31 remain having the true value.

Thus, the S-CSCF 32, when querying the table with reference to terminal 2 or 4 is informed that the data for the terminals 2 and 4 corresponds to that stored in the associated HSS 29, 31. Therefore, as the data in the S-CSCF 32 corresponds to that stored in the associated HSS 29, 31, the S-CSCF 32 does not have to take any further action to obtain profiles for these terminals.

The change of HSS confirmation flag status in the S-CSCF 32 means that when the S-CSCF queries the table with reference to any one of terminals 1, 3 or 5 will determine that these user terminals have a false HSS confirmation flag and thus, the user data associated with the user terminals is not up to date.

The S-CSCF 32 upon changing an HSS confirmation flag to false transmits a server assignment request (SAR) to HSS2 30 to request the terminal's profile. HSS2 30 responds to receipt of a SAR by transmitting a server assignment answer (SAA) containing user data details for the user terminal. The S-CSCF 32 receives the SAR and compares the user details in the SAR to those stored in the S-CSCF 32. If the user details in the SAR are not the same as those stored in the S-CSCF 32 then the S-CSCF 32 updates the user details for that terminal and changes the status of the HSS confirmation flag to true. If the user details in the SAR are the same as those stored in the S-CSCF 32 then the S-CSCF 32 changes the status of the HSS confirmation flag to true. Once the status of the HSS Confirmed flag has been changed to true the communications session can continue as before.

An HSS-Reset message may also be sent by HSS2 30 to any application servers (not shown) in the IMS 34. As with the S-CSCF 32 the receipt of an HSS-Reset message causes the application server to set the HSS Confirmed flag for each user terminal associated with HSS2 30 as false. A flag being marked false causes the application server to transmit a user data request (UDR) message to HSS2 30. Upon receiving the UDR message HSS2 identifies the user terminal and transmits the latest data for the user terminal to the application server. The data for the user terminal is sent as part of a user data answer (UDA) message. The application server upon receiving the UDA updates the user terminal details and sets the HSS confirmed flag to true. The application server can then supply services to the user terminal.

It is preferable, to minimise the data traffic across the network, that the S-CSCF and application server do not immediately transmit SARs and UDRs respectively for all user terminals when the status of the user terminal's HSS Confirmed flag is changed to false upon receipt of an HSS-Reset message. Instead, in order that the network is not flooded with these requests, it is advantageous that a trigger causes the S-CSCF and application server to request terminal details for a record having an HSS confirmed flag set to false. The trigger may be generated internally or externally to the S-CSCF and application server.

Figure 3:
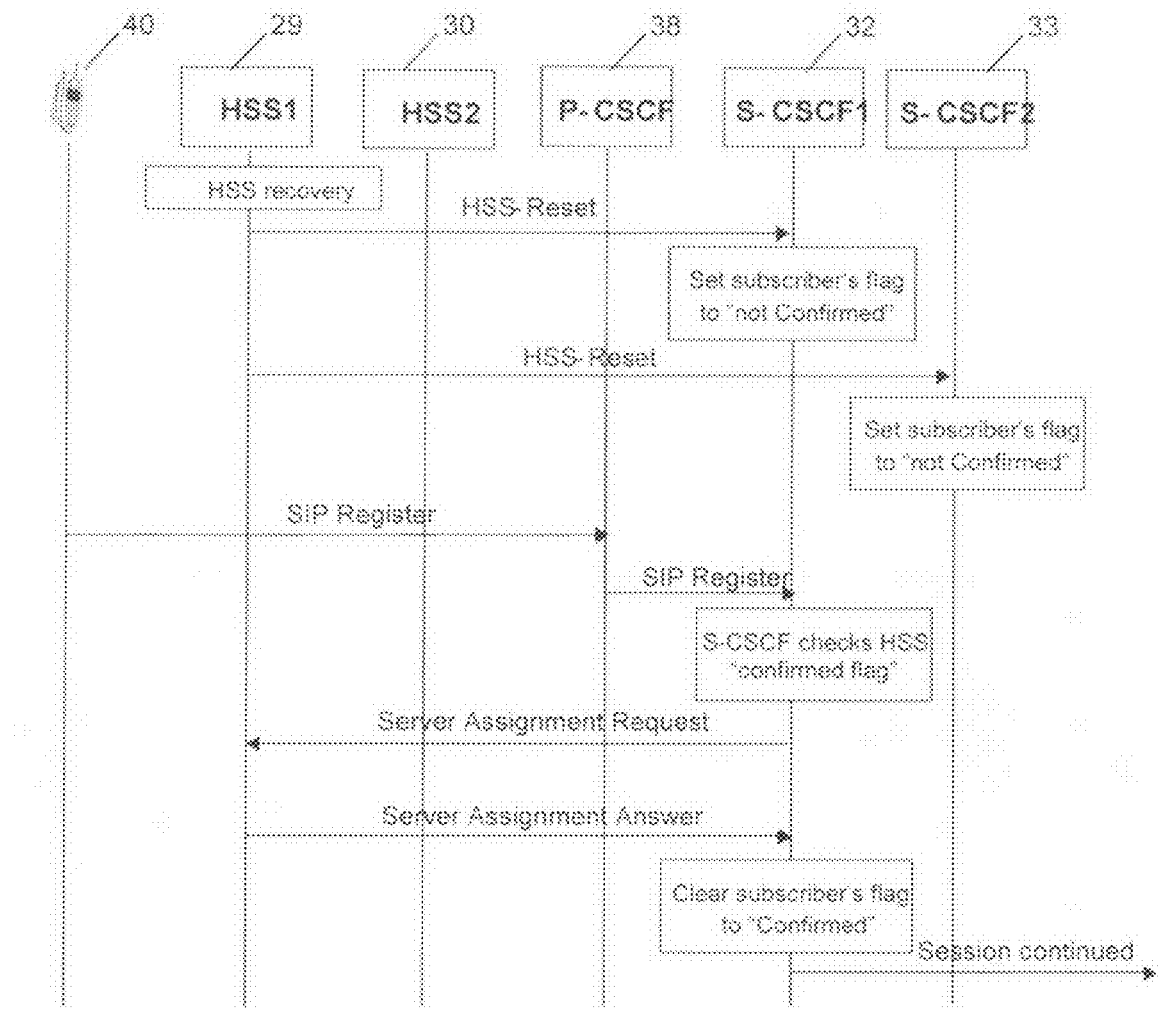
FIG. 3 illustrates a subscriber data recovery sequence for the S-CSCF following an HSS Reset.

An example of an externally generated trigger is a user terminal initiated trigger as illustrated in FIG. 3. As can be seen in FIG. 3, and according to the method described previously, HSS1 29 undergoes HSS recovery and, when it is operational again, transmits an HSS-Reset message to any S-CSCFs 32, 33 in the IMS, in this instance S-CSCF1 32 and S-CSCF 2 33. Upon receipt of the HSS-Reset message S-CSCF1 and 2 32, 33 set all the HSS confirmed flags for user terminals 40 associated with HSS1 29 to false.

To initiate a session using the IMS a user terminal 40 transmits a SIP message to the IMS. Typically, the message is received by a P-CSCF 38 which forwards it to an S-CSCF 32 present in the home IMS. The S-CSCF 32 checks the status of the HSS-confirmed flag for the terminal 40. If the user terminal 40 is associated with HSS1 29, the value will be false and consequently the S-CSCF 32 will transmit a SAR to HSS1 29. HSS1 29 then checks the user profile of the user terminal and transmits a SAA including user profile data for the user terminal. The S-CSCF 32 upon receiving the SAA with valid user profile data sets the HSS Confirmed flag to true. A communication session can then proceed as normal.

Alternatively, a user terminal terminating a communication session may prompt the S-CSCF 32 to send a SAR to the appropriate HSS.

Normally, it is an implementation decision as to whether an SAR is transmitted by the S-CSCF when a user terminal re-registers with the IMS. However, in the case the HSS Confirmed flag for the user terminal is set to false, the S-CSCF is mandated to send an SAR request to the HSS when the user terminal re-registers with the IMS.

Figure 4:
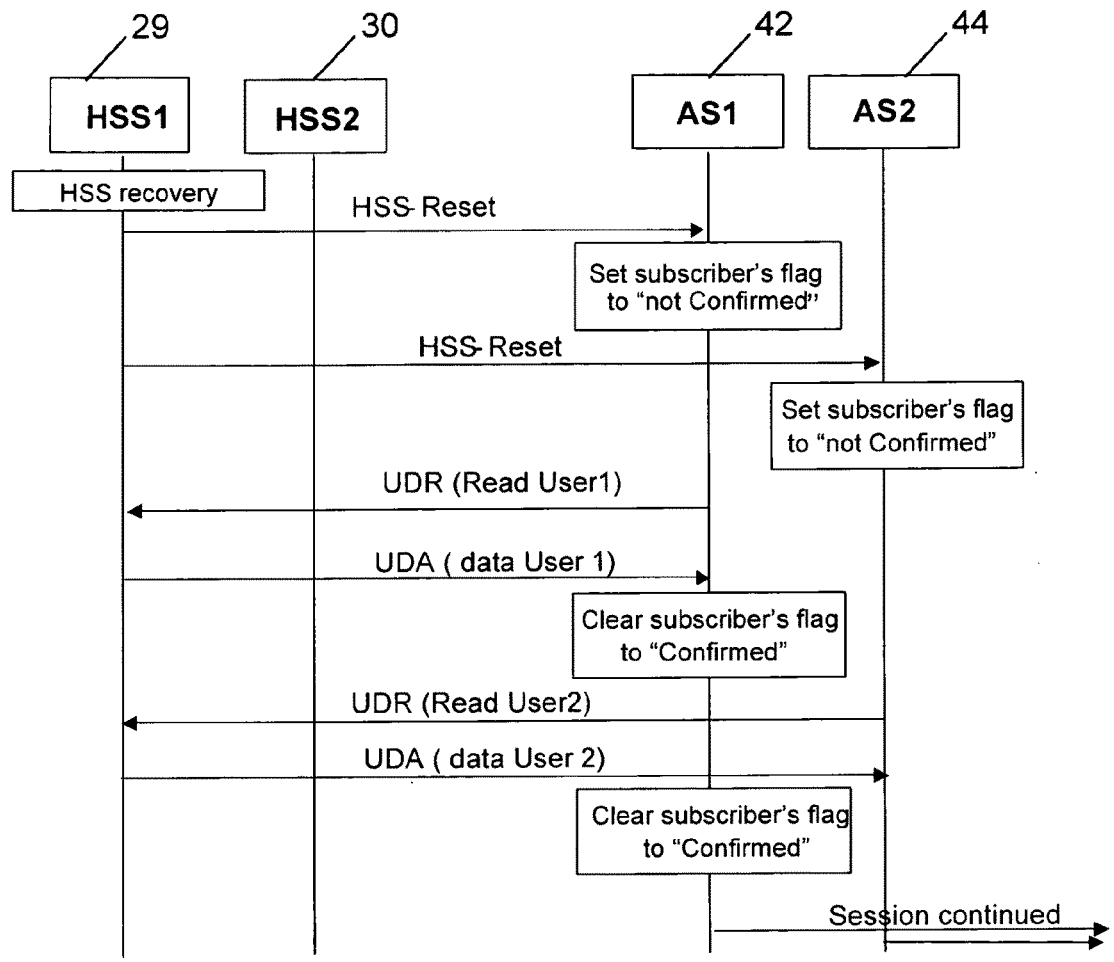
FIG. 4 illustrates a subscriber data recovery sequence for an AS following an HSS Reset.

An example of a trigger that causes an application server to confirm a user terminal's details is receipt of a request to access a service. This process is shown in FIG. 4. As in FIG. 3, HSS1 29 undergoes a reset causing an HSS-Reset message to be transmitted to all application servers in the IMS when HSS1 29 recovers and is operational. Receipt of the HSS-Reset message causes AS1 42 and AS2 44 to change the HSS-Confirmed flag to false for any user terminals (not shown) whose details are on HSS1 29.

The next time a user terminal associated with HSS1 29 attempts to access a service on an application server 42, 44, the application server 42, 44 transmits a UDR to HSS1 29. Upon receipt of the UDR, HSS1 29 transmits a UDA containing user profile data for the user terminal. Receipt of the UDA causes the application server 42, 44 to update the user terminal's profile data and set the HSS-Confirmed flag to true for that user terminal. The application server 42, 44 then provides the service to the user terminal.

AS2 may initiate a corresponding exchange of messages when a user terminal attempts to access a service provided by AS2.

Other triggers which may trigger an application server to send a UDR are: an invite request received from an S-CSCF; a third-party registration request received from an S-CSCF; an operator performing an action on the application server or actions performed on a web interface associated with the application server.

As will be understood by one skilled in the art any suitable trigger may be used to cause the S-CSCF or application server to query the HSS about the user terminal's profile.

The HSS may be provided with an additional field associated with the profile for each user terminal. The additional field indicates whether user profile data for the user terminal has been downloaded to each S-CSCF since the HSS transmitted the HSS-Reset message. This means that if the HSS receives an SAR message from an S-CSCF requesting the HSS to not download data for the user terminal the HSS can determine whether user profile data has been transmitted to the S-CSCF since an HSS-Reset occurred. If the user profile data has been transmitted to the S-CSCF since the HSS-Reset then the communication session can continue in a conventional manner. If the HSS determines that user profile data for the user terminal has not been transmitted to the S-CSCF since a HSS-Reset, the HSS overrides this request and transmits a SAA containing user profile data for the user terminal in the response to the SAR. This allows a session to continue with the most up-to-date data for the user terminal.

Preferably, the HSS-Reset message is a Diameter message having the structure shown below:

| < HSS-Reset-Request > ::= | < Diameter Header: 310, 167772151, REQ, PXY > |
|---|---|
| | < Session-Id > |
| | { Vendor-Specific-Application-Id } |
| | { Auth-Session-State } |
| | { Origin-Host } |
| | { Origin-Realm } |
| | [ Destination-Host ] |
| | { Destination-Realm } |
| | *[ Supported-Features ] |
| | { HSS-Name } |
| | *[ AVP ] |
| | *[ Proxy-Info ] |
| | *[ Route-Record ] |

The HSS-Reset Answer sent by the application server or S-CSCF to acknowledge receipt of the HSS-Reset Request is preferably also a Diameter message having the structure shown below:

| < HSS-Reset-Answer > ::= | < Diameter Header: 310, 167772151, REQ, PXY > |
|---|---|
| | < Session-Id > |
| | { Vendor-Specific-Application-Id } |
| | { Auth-Session-State } |
| | { Origin-Host } |
| | { Origin-Realm } |
| | [ Destination-Host ] |
| | { Destination-Realm } |
| | *[ Supported-Features ] |
| | *[ Failed-AVP ] |
| | *[ AVP ] |
| | *[ Proxy-Info ] |
| | *[ Route-Record ] |

It is advantageous to use Diameter messages in this process as Diameter messages have to be acknowledged and therefore delivery is assured; however, as will be understood by one skilled in the art any suitable messages may be used.

Although the invention has been described with reference to SAR, SAM UDR and UDA messages, any suitable message type may be used to request and transmit user profile data.

What is claimed is:

1. A method for verifying user profile data for a terminal in an IP multimedia sub-system (IMS) network, the method including: at a component:
receiving, from a home subscriber server (HSS), a notification message indicating a home subscriber server (HSS) reset;
in response to receiving the notification message, marking a terminal associated with the HSS for indicating that user profile data associated with the terminal is not confirmed by the HSS;
transmitting, to the HSS, a request message for bypassing a download of the user profile data associated with the terminal, wherein the HSS is configured to override the request message if the user profile data has not been downloaded since the HSS transmitted the notification message;
receiving, from the HSS, a response message including the user profile data associated with the terminal; and
in response to receiving the response message including the user profile data associated with the terminal, marking the terminal for indicating that the user profile data associated with the terminal is confirmed by the HSS.

2. The method of claim 1 wherein the component is a serving call session control function (S-CSCF).

3. The method of claim 1 wherein the request message is transmitted in response to a trigger.

4. The method of claim 3 wherein the trigger is one of the group comprising: receiving a registration request from a terminal, receiving a session termination request from a terminal, receiving a re-registration request from a terminal and a registration timer expiring.

5. The method of claim 2 wherein the request message is a server assignment request message and the response message is a server assignment answer containing the user profile data.

6. The method of claim 1 wherein the component is an application server.

7. The method of claim 6 wherein the request message is transmitted in response to a trigger.

8. The method of claim 7 wherein the trigger is one of the group comprising: a request for a service from a terminal, an invite request from an S-CSCF, a third-party registration request from an S-CSCF, an operator performing an action on the application service and an action being performed on a web interface to the application server.

9. The method of claim 6 wherein the request message is a user data read message and the response message is a user data answer message containing the user profile data.

10. The method of claim 1 wherein marking the terminal associated with the HSS comprises changing an HSS confirmed flag for the terminal to false.

11. The method of claim 6 wherein marking the terminal for indicating that the user profile data associated with the terminal is confirmed by the HSS comprises changing an HSS confirmed flag for the terminal to true.

12. The method of claim 1 further comprising marking, at the HSS, a terminal for which a notification message has been transmitted but the user profile data has not been downloaded since the HSS transmitted the notification message.

13. The method of claim 12 further comprising removing, at the HSS, the mark when a request message is received for the terminal.

14. The method of claim 1 wherein the notification message is an HSS-Reset message.

15. The method of claim 1 wherein the notification message and request message are Diameter messages.

16. A home subscriber server (HSS) HSS for operating in an IP multimedia sub-system (IMS) network comprising:
a database, implemented using physical storage, for storing subscriber data associated with a terminal; and
an interface for transmitting, to a component in the IMS, a notification message indicating a home subscriber server (HSS) reset, the interface also for receiving, from the component, a request message for the subscriber data associated with the terminal, and for transmitting, to the component and in response to receiving the request message for the subscriber data associated with the terminal, a response message containing the subscriber data associated with the terminal,
wherein the HSS marks a terminal for which a notification message has been transmitted but the subscriber data has not been downloaded since the HSS transmitted the notification message and removes the mark when a request message for the subscriber data is received for the terminal,
wherein the HSS is configured to override a request by the component to bypass a download of the subscriber data if the user profile data has not been downloaded since the HSS transmitted the notification message.

17. A serving call session control function (S-CSCF) for operating in an IP multimedia sub-system (IMS) network comprising:
an input for receiving a notification message indicating a home subscriber server (HSS) reset;
a database including subscriber data;
processing means for marking a terminal in the database associated with the HSS from which the notification message was received, wherein marking the terminal in the database associated with the HSS indicates that the subscriber data associated with the terminal is not confirmed by the HSS;
an output for transmitting a request message for a marked terminal to the HSS;
an input for receiving a response message from the HSS containing the subscriber data associated with the terminal; and
processing means for marking, in response to receiving the response message containing the subscriber data associated with the terminal, the terminal for indicating that the subscriber data associated with the terminal is confirmed by the HSS,
wherein a request by the S-CSCF to bypass a download of the user profile data is overridden if the user profile data has not been downloaded since the HSS transmitted the notification message.

18. An application server for operating in an IP multimedia sub-system (IMS) network comprising:
an input for receiving a notification message indicating a home subscriber server (HSS) reset;
a database including subscriber data;
processing means for marking a terminal in the database associated with the HSS from which the notification message was received, wherein marking the terminal in the database associated with the HSS indicates that the subscriber data associated with the terminal is not confirmed by the HSS;
an output for transmitting a request message for a marked terminal to the HSS;
an input for receiving a response message from the HSS containing the subscriber data associated with the terminal; and
processing means for marking, in response to receiving the response message containing the subscriber data associated with the terminal, the terminal for indicating that the subscriber data associated with the terminal is confirmed by the HSS, wherein a request by the application server to bypass a download of the user profile data is overridden if the subscriber data has not been downloaded since the HSS transmitted the notification message.

19. A system for operating in an IP multimedia sub-system (IMS) network comprising:

a home subscriber server (HSS) comprising a database for storing user profile data associated with a terminal, and an interface for transmitting a notification message indicating a home subscriber server (HSS) reset to a component in the IMS and transmitting, in response to receiving a request message for user profile data associated with the terminal, a response message to the component containing the user profile data associated with the terminal, wherein the HSS is configured to override a request by a component to bypass a download of the user profile data if the user profile data has not been downloaded since the HSS transmitted the notification message; and a serving call session control function (S-CSCF) comprising:

an input for receiving a notification message indicating a home subscriber server (HSS) reset;

a database including user profile data;

processing means for marking a terminal in the database associated with the HSS from which the notification message was received, wherein marking the terminal in the database associated with the HSS indicates that the user profile data associated with the terminal is not confirmed by the HSS;

an output for transmitting a request message for a marked terminal to the HSS;

an input for receiving a response message from the HSS containing the user profile data associated with the terminal; and processing means for marking, in response to receiving the response message containing the user profile data associated with the terminal, the terminal for indicating that the user profile data associated with the terminal is confirmed by the HSS.

20. A system for operating in an IP multimedia sub-system (IMS) network comprising:

a home subscriber server (HSS) comprising a database for storing user profile data associated with a terminal, and an interface for transmitting a notification message indicating a home subscriber server (HSS) reset to a component in the IMS and transmitting, in response to receiving a request message for user profile data associated with the terminal, a response message to the component containing the user profile data associated with the terminal, wherein the HSS is configured to override a request by a component to bypass a download of the user profile data if the user profile data has not been downloaded since the HSS transmitted the notification message; and an application server comprising:

an input for receiving the notification message indicating a home subscriber server (HSS) reset;

a database including user profile data;

processing means for marking a terminal in the database associated with the HSS from which the notification message was received, wherein marking the terminal in the database associated with the HSS indicates that the user profile data associated with the terminal is not confirmed by the HSS;

an output for transmitting a request message for a marked terminal to the HSS;

an input for receiving a response message from the HSS containing the user profile data associated with the terminal; and processing means for marking, in response to receiving the response message containing the user profile data associated with the terminal, the terminal for indicating that the user profile data associated with the terminal is confirmed by the HSS.

* * * * *